Patented Mar. 10, 1936

2,033,509

UNITED STATES PATENT OFFICE 2,033,509

MUD LINING OIL AND GAS WELLS

Clifford P. Bowie, Berkeley, Calif.

No Drawing. Application December 3, 1935, Serial No. 52,663

7 Claims. (Cl. 255—1)

My invention relates to the art of drilling wells, and more especially to the mud lining of oil and gas wells.

It is customary, in drilling the majority of oil and gas wells, to keep the hole filled with circulating mud fluid, which, being pumped down through the drill stem and rising between said stem and the wall of the hole, carries out the cuttings of the drill bit. The mud fluid, by its weight and pressure, prevents the well from blowing in prematurely, by keeping back the flow of oil or gas. It forms a compact lining on the wall of the hole, which often, after bailing out, prevents caving and seepage of water into and out of the well, and lubricates the drill stem which facilitates drilling operations. Unfortunately, such mud lining also prevents the flow of oil or gas, under conditions of low pressure, into the well even after it is bailed out, so that sometimes a producing stratum will be drilled through without the drillers being aware of the fact, and the well may be abandoned as a dry hole merely because the mud lining is holding back what would otherwise be valuable production.

The principal object of my invention is to provide a mud lining which will be comparatively impermeable to water, but which will be permeable to oil or gas, thereby shutting out undesirable water but permitting oil or gas to enter the well with comparative freedom. I achieve this object by adding to the mud fluid a substance which is insoluble in water, but soluble in hydrocarbons or capable of being acted upon by them in such a manner as to allow them to permeate the mud lining.

Various substances may be used in the mud fluid for this purpose, as described hereinafter, but they must be in such form that they will be carried in suspension in the mud, and must be of such a nature as to not interfere with the normal function thereof. It should be clearly understood that the substances soluble in or acted upon by oil or gas are additional to the normal ingredients of the mud itself, which consists, as usual, of finely divided clay suspended in water or in some other suitable liquid.

I have found that certain gums, such as rosin and chicle, asphalts, either natural or synthetic, and soaps, such as stearates of zinc, calcium, lead, or other metals, can be used with satisfactory results, all of these substances being dissolved or affected by hydrocarbons to a greater extent than by water. As a result of such solubility, the mud lining of the hole is permeated and softened, and may even be washed away, by oil or gas extruding from the earth formation, and such oil and gas can therefore flow into the well. Water, however, is unable to affect the treated mud containing these substances any more than it can affect the ordinary mud without them, so that if a proper mud lining is formed, by the usual effect of pressure and the rotating of the drill stem, the treated mud will act in the same manner as the ordinary mud where water bearing strata are encountered. Moreover, the addition of these substances will not affect the colloidal properties of the mud or its lubricating value in drilling operations.

All of the substances mentioned above are cheap and can be obtained in abundance. They may be used singly or in combination. The amount of added substance will vary with different conditions encountered in the hole, one half of one per-cent, by volume, being about the minimum capable of producing the desired effect. The added substances may be mixed with the mud in any desired manner.

Under some conditions, it may be desirable to use some substance other than water for the liquid content of the mud. Glycerine, or a mixture of glycerine and water, or oil, may be cited as examples of such liquids. The advantage gained thereby lies in the fact that the particles of the oil-soluble substance will be coated with a film of liquid which, unlike water, is soluble in or readily miscible with, hydrocarbons, and will therefore be more readily affected by them, making the mud more permeable to oil or gas.

I claim:

1. A drilling mud for use in lining oil and gas wells comprising a liquid vehicle, clay, and a substance at least partially soluble in hydrocarbons, said clay and said soluble substance being carried in suspension in said vehicle, whereby the mud lining of the well will be readily permeated by oil and gas.

2. A drilling mud for use in lining oil and gas wells comprising water, clay, and an added substance more soluble in hydrocarbons than in water, said clay and said added substance being carried in suspension in said vehicle, whereby the mud lining of the well will be more permeable by oil and gas than by water.

3. A drilling mud for use in lining oil and gas wells comprising a liquid vehicle, clay, and a gum, said clay and said gum being carried in suspension in said vehicle, and said gum being more soluble in hydrocarbons than in water, whereby the mud lining of the well will be more permeable by oil and gas than by water.

4. A drilling mud for use in lining oil and gas wells comprising a liquid vehicle, clay, and an asphalt, said clay and said asphalt being carried in suspension in said vehicle, and said asphalt being more soluble in hydrocarbons than in water, whereby the mud lining of the well will be more permeable by oil and gas than by water.

5. A drilling mud for use in lining oil and gas wells comprising a liquid vehicle, clay, and a soap, said clay and said soap being carried in suspension in said vehicle, and said soap being more soluble in hydrocarbons than in water, whereby the mud lining of the well will be more permeable by oil and gas than by water.

6. The method of treating oil and gas wells during the drilling thereof which consists in supplying the well with a mud characterized by the presence of a substance at least partially soluble in hydrocarbons, causing said mud to adhere to the walls of the well to form a compact lining permeable by oil and gas, and bailing out the uncompacted portion of said mud to permit oil and gas to permeate said lining and enter the well.

7. The method of treating oil and gas wells during the drilling thereof which consists in supplying the well with a mud having added thereto a substance more soluble in hydrocarbons than in water, causing said mud to adhere to the walls of the well to form a compact lining more permeable by oil and gas than by water, and bailing out the uncompacted portion of said mud to permit oil and gas to permeate said lining and enter the well.

CLIFFORD P. BOWIE.